(12) United States Patent
Dodson

(10) Patent No.: US 12,440,201 B2
(45) Date of Patent: Oct. 14, 2025

(54) ANCHORING APPARATUS

(71) Applicant: Mark A. Dodson, Ridgeland, MS (US)

(72) Inventor: Mark A. Dodson, Ridgeland, MS (US)

( * ) Notice: Subject to any disclaimer, the term of this patent is extended or adjusted under 35 U.S.C. 154(b) by 503 days.

(21) Appl. No.: 17/851,823

(22) Filed: Jun. 28, 2022

(65) Prior Publication Data

US 2023/0000535 A1  Jan. 5, 2023

Related U.S. Application Data

(60) Provisional application No. 63/216,581, filed on Jun. 30, 2021.

(51) Int. Cl.
| A61B 17/04 | (2006.01) |
| A61B 17/80 | (2006.01) |
| A61B 17/82 | (2006.01) |
| A61B 17/86 | (2006.01) |
| A61B 17/56 | (2006.01) |

(52) U.S. Cl.
CPC .......... *A61B 17/0401* (2013.01); *A61B 17/80* (2013.01); *A61B 17/82* (2013.01); *A61B 17/8605* (2013.01); *A61B 2017/564* (2013.01); *A61B 2017/8655* (2013.01)

(58) Field of Classification Search
CPC ........ A61B 2017/0404; A61B 17/0401; A61B 17/82
See application file for complete search history.

(56) References Cited

U.S. PATENT DOCUMENTS

| 4,920,959 | A | 5/1990 | Witzel et al. |
| 5,330,473 | A | 7/1994 | Howland |
| 5,741,259 | A | 4/1998 | Chan |
| 5,935,133 | A | 8/1999 | Wagner et al. |
| 6,206,879 | B1 | 3/2001 | Marnay et al. |
| 6,391,030 | B1 | 5/2002 | Wagner et al. |
| 6,454,768 | B1 | 9/2002 | Jackson |
| 6,540,749 | B2 | 4/2003 | Schafer et al. |
| 7,250,054 | B2 * | 7/2007 | Allen ............... A61B 17/82 |
| | | | 606/103 |
| 7,503,918 | B2 | 3/2009 | Baccelli et al. |
| 9,173,685 | B2 | 11/2015 | Lindquist et al. |
| 9,433,442 | B2 | 9/2016 | Lindemann et al. |
| 9,788,876 | B2 | 10/2017 | Stone et al. |
| 2004/0087954 | A1 | 5/2004 | Allen et al. |
| 2004/0097942 | A1 | 5/2004 | Allen et al. |
| 2005/0171537 | A1 | 8/2005 | Mazel et al. |

(Continued)

FOREIGN PATENT DOCUMENTS

| DE | 29818831 U1 | 12/1998 |
| FR | 2734471 A1 | 11/1996 |

(Continued)

*Primary Examiner* — Olivia C Chang
(74) *Attorney, Agent, or Firm* — Phelps Dunbar, LLP; Mary H. Drabnis

(57) ABSTRACT

This invention provides an anchoring apparatus comprising a primary anchor and a secondary anchor. The primary anchor defines a primary bore, a tail section, and a head section. The head section defines a pair of substantially parallel bores extending through the head section of the primary anchor. The secondary anchor is sized and configured to mate with the head section of the primary anchor at a head section opening of the primary bore.

12 Claims, 3 Drawing Sheets

(56) References Cited

U.S. PATENT DOCUMENTS

| | | |
|---|---|---|
| 2007/0122764 A1 | 5/2007 | Balfour et al. |
| 2009/0264933 A1 | 10/2009 | Carls et al. |
| 2010/0063546 A1 | 3/2010 | Miller et al. |
| 2010/0087865 A1 | 4/2010 | Biedermann et al. |
| 2011/0301644 A1 | 12/2011 | Belliard |
| 2018/0296259 A1 | 10/2018 | Gephart |
| 2019/0290334 A1 | 9/2019 | Prygoski et al. |
| 2021/0177394 A1 | 6/2021 | Rippe et al. |

FOREIGN PATENT DOCUMENTS

| | | |
|---|---|---|
| WO | 9532676 A1 | 12/1995 |
| WO | 2015/117207 A1 | 8/2015 |
| WO | 2023/278412 A1 | 1/2023 |

\* cited by examiner

ANCHORING APPARATUS

TECHNICAL FIELD

This invention relates to an anchoring apparatus comprised of anchor pieces (typically screws) used in conjunction with cables, which apparatus is capable of use in medical applications, especially orthopedic applications.

BACKGROUND

Anchoring mechanisms are often employed in orthopedic applications to keep body tissue, especially bone tissue, in position. Anchor screws are often used for this purpose; in some instances, an orthopedic plate held in place by anchor screws is used. In some instances, anchor screws that keep an orthopedic plate in position are used in orthopedic applications.

However, there are situations in which anchor screws alone, or in which an orthopedic plate held in place by anchor screws, are not satisfactory.

SUMMARY OF THE INVENTION

This invention provides anchoring apparatus that can address situations in which anchor screws alone, or in which an orthopedic plate held in place by anchor screws, are not satisfactory, as well as providing ways to utilize orthopedic plates with anchoring apparatus that are minimally invasive to body tissue.

An anchoring apparatus provided by this invention can apply an adjustable amount of tension or torque to a cable. The anchoring apparatus has a primary anchor that can be of variable length, allowing flexibility in how the anchoring apparatus can be employed. The anchoring apparatus are used with one or more cables which are secured by the anchors; advantageously, one or more support plates (usually orthopedic plates) are not necessary for the anchoring function, although one or more support plates can be used if desired.

In one embodiment, the anchoring apparatus is comprised of a primary anchor and a secondary anchor. In another embodiment, the anchoring apparatus comprises a plurality of anchor sets, each set comprising a primary anchor, a secondary anchor, and a cable.

These and other embodiments and features of this invention will be still further apparent from the ensuing description and appended claims.

Figure 1:
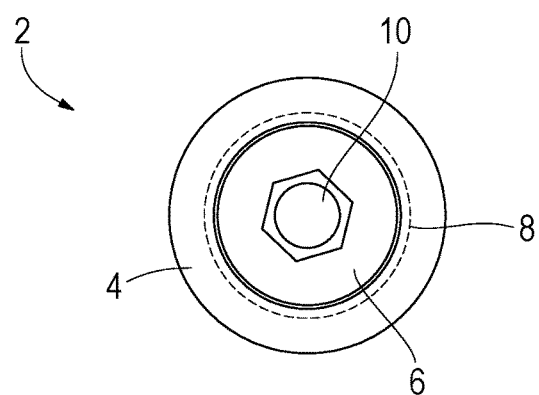
FIG. 1 is a top view of a head section of a primary anchor with a secondary anchor positioned (mated) therein.

The Figures illustrate embodiments of specific aspects of the invention, and are not intended to impose limitations on the scope of the invention.

FURTHER DETAILED DESCRIPTION OF THE INVENTION

As used throughout this document, the word "cable" is used to signify any material suitable for human or animal surgical use and includes cable, wire, suture thread, and other materials that may be suitable. Unless otherwise stated, all of the claims and discussion apply equally to all of these materials.

The primary anchor of the anchoring apparatus defining a primary bore, a head section, and a tail section. The primary bore extends along an imaginary longitudinal axis of the primary anchor interior to the primary anchor and the primary bore is normally and preferably cylindrical in shape.

In the primary anchor, the head section can be considered to be at one end of the imaginary longitudinal axis of the primary bore, with the tail section at the other end of the imaginary longitudinal axis of the primary bore. The tail section of the primary bore defines a tail section opening of the primary bore. In some embodiments, the tail section of the primary bore forms a threaded section on an interior surface portion of the sidewall of the primary bore.

Preferably, the primary anchor forms a threaded exterior portion. More preferably, the primary anchor forms a threaded exterior portion and a threaded section on an interior surface portion of the sidewall of the primary bore.

The anchoring apparatus may further comprise an extension member sized and configured to mate with the primary anchor at the tail section opening of the primary anchor. In preferred embodiments, the mating of the primary anchor and the extension member is via threading of the extension member and at least a portion of the tail section of the primary anchor. More preferably, the threading of the tail section to connect to an extension member is on an interior surface portion of the sidewall of the primary bore. In preferred embodiments, the extension member is a threaded cylindrical extension member. Still more preferably, the extension member is a threaded cylindrical extension member and the tail section has threading to connect to an extension member on an interior surface portion of the sidewall of the primary bore.

The length of the anchoring apparatus can be varied as needed, by having primary anchors of different length, and/or by having primary anchors to which extension members of different lengths can be connected.

The head section of the primary anchor defines a head section opening of the primary bore, and the head section also defines a pair of substantially parallel bores extending through the head section of the primary anchor.

Each substantially parallel bore in the head section of the primary anchor (a) extends along an imaginary bore axis which bore axis is disposed at an angle relative to the imaginary longitudinal axis of the primary anchor, (b) is in communication with at least a portion of the primary bore, and (c) is sized and configured to receive a portion of a cable therein and therethrough. The bores need not be parallel, but parallel orientation is preferred. In preferred embodiments, the imaginary bore axes are substantially perpendicular to the imaginary longitudinal axis of the primary anchor.

Preferably, the head section forms a threaded section on an interior surface portion of a sidewall of the primary bore; more preferably, the threaded section is closer to the head section opening than are the substantially parallel bores. In an alternate embodiment, the threaded portion of the secondary anchor is an extension from the mating end of the secondary anchor; the threaded section mates with at least a portion of a threaded interior portion of the primary bore.

In preferred embodiments, the head section of the primary bore forms a threaded section on an interior surface portion of a sidewall of the primary bore, and the tail section of the primary bore forms a threaded section on an interior surface portion of the sidewall of the primary bore and/or on an exterior surface of the primary anchor; and in some of these embodiments, the anchoring apparatus has an extension member sized and configured to mate with the primary bore at the tail section opening of the primary anchor.

In another embodiment, the primary anchor is comprised of a head member and a tail member configured for detachable coupling therewith, the head member defining the head section and the tail member defining the tail section of the primary anchor. In an alternate embodiment, the primary anchor is comprised of a head member, a tail member, and a coupling member, where the head section and tail section are configured to mate with each other, and the coupling member detachably attaches to the head section and to the tail section. This permits head sections and tail sections to be interchanged. In preferred embodiments of this alternate arrangement, the head section and tail section form external threading, and the coupling member has internal threading configured to position the coupling member over the external threading portions of the head section and of the tail section (as a sleeve).

The secondary anchor is sized and configured to mate with the head section of the primary anchor at the head section opening of the primary bore. The secondary anchor comprises a mating end section sized and configured to extend into a portion of both of the substantially parallel bores of the primary anchor when the mating end section of the secondary anchor is received by the primary anchor in the head section of the primary bore. In preferred embodiments, the top of the secondary anchor is sized and configured to receive a tool such as a hexagonal wrench or a screwdriver to aid in mating the secondary anchor to the primary anchor.

Preferably, the secondary anchor is threadably connectable to the primary anchor. In preferred embodiments in which the head section of the primary anchor forms a threaded section on an interior surface portion of a sidewall of the primary bore, the secondary anchor is preferably threaded and sized and configured to mate with at least a portion of the threaded section of the head section of the primary anchor. In some preferred embodiments, the secondary anchor is a set screw.

In another embodiment, the anchoring apparatus comprises one or more anchor sets. Each anchor set comprises a primary anchor, a secondary anchor, and a cable. The primary anchor and the secondary anchor and the preferences therefor are as described above; an extension member as described above may also be included in one or more anchor sets.

The cable comprises two end sections. Each end section is sized and configured to extend through a respective one of the pair of substantially parallel bores, so that a portion of the cable is held in its respective one of the pair of substantially parallel bores by the secondary anchor when the mating end section of the secondary anchors is mated with the head section of the primary anchor at the head section opening.

The number of anchoring apparatus can be varied as needed. When more than one anchoring apparatus is used, the anchoring apparatus can be at any desired spacing, and the head sections of the primary anchors do not need to be coplanar.

In some embodiments, the anchoring apparatus further comprises at least one support plate defining one or more apertures, each aperture being sized and configured to receive at least a portion of a primary anchor and/or at least a portion of an extension member of the anchoring apparatus. A support plate may have a plurality of apertures, one or more apertures being sized and configured to receive at least a portion of a primary anchor, and one or more apertures being sized and configured to receive at least a portion of an extension member. Typically, only one support plate is present. The anchoring apparatus can be used with various types of support plates.

In the practice of this invention, the primary anchor and/or an extension member attached thereto are sized and configured to be received directly into body tissue, preferably bone tissue. In some embodiments, the primary anchor is sized and configured to be received into both a support plate and body tissue, preferably bone tissue. Often, a support plate is used to stabilize body tissue, especially bone tissue. One of the preferred applications for the anchoring apparatus with or without a support plate is for bone fracture fixation. The anchoring apparatus can also stabilize joints and/or ligaments, for example to treat a ligament tear.

In the practice of this invention, the primary anchor is held by body tissue, especially bone tissue, and the secondary anchor maintains the tension on the cable(s) and secures the cable(s) in place in the primary anchor.

In some embodiments, the anchoring apparatus can hold in place a body tissue graft, especially a graft of ligament tissue onto bone tissue; the sutures holding ligament tissues can be reinforced by the anchoring apparatus of this invention.

In a particularly preferred embodiment, the anchoring apparatus comprises
  a primary threaded screw which defines i) a primary threaded bore extending along an imaginary longitudinal axis of the primary threaded screw, ii) a threaded tail section defining a tail section opening, and iii) a head section defining a head section opening of the primary threaded bore and defining a pair of substantially parallel bores extending through the head section of the primary threaded screw, each parallel bore
    (a) extending along an imaginary bore axis which is disposed at a substantially perpendicular angle relative to the imaginary longitudinal axis of the primary threaded screw,
    (b) being in communication with least a portion of the primary threaded bore, and
    (c) being sized and configured to receive a portion of a cable therein and therethrough, and
  a secondary threaded screw sized and configured to mate with the head section of the primary threaded screw at the head section opening of the primary threaded bore and with at least a portion of the threaded section of the primary bore, the secondary threaded screw comprising a mating end section sized and configured to extend into a portion of both of the substantially parallel bores when the mating end section is received by the primary threaded screw at the head section opening of the primary threaded bore.

A method of the invention is a method for anchoring body tissue, which method comprises:
  optionally placing a support plate adjacent to body tissue;
  placing a cable around or through body tissue, and, when present, around the support plate, the cable comprising opposing end sections;
  drawing at least one end section of the cable into or through, and disposing a portion of said cable within, one of a pair of substantially parallel bores of a primary anchor;
  tensioning the cable, and
  mating a secondary anchor with the primary anchor, a mating end section of the secondary anchor extending into a portion of both of the substantially parallel bores, thereby contacting the mating end section and the portion of the cable(s) in the substantially parallel bore(s).

Preferably, for the methods of the invention, the features of the primary anchor, secondary anchor, and preferences therefor are as described above for the anchoring apparatus.

The body tissue generally comprises bone tissue, ligament tissue, or bone tissue and ligament tissue in the embodiments of this invention.

The tensioning of the cable can be accomplished by any convenient tensioning device.

In the practice of this invention, a portion of a cable can be in one or both of the substantially parallel bores of the primary anchor. Normally and preferably, the portion of cable in the substantially parallel bore is enough to fill the parallel bore, which permits the secondary anchor to secure the cable. When a cable end section is positioned in a parallel bore, enough cable to fill the parallel bore is used, such that the end of the cable is substantially flush with, or, preferably, extends from, the end of the parallel bore.

One end section of a cable can be drawn through a first parallel bore, placed around or through body tissue, and around a support plate, if present, and drawn through a second parallel bore. In some embodiments, the parallel bores through which the end sections of a cable are drawn are in different primary anchors. A secondary anchor needs to be mated with each primary anchor through which the cable is drawn. In preferred embodiments, the cable is drawn through parallel bores on the same primary anchor. In another embodiment, the cable can go through one or more holes defined by a support plate; an anchor apparatus can hold the cable in place in the support plate hole.

The cable end sections can go into and through the parallel bores in either direction. The portions of cable in the parallel bores do not need to be fully enclosed when the secondary anchor has been mated with the primary anchor.

When the cable is wrapped around body tissue(s) and the cable is tensioned, the cable tightens and compresses the body tissue(s). An advantage provided by this invention is that when the secondary anchor is secured in the anchoring apparatus (for example, by tightening a screw), providing tension to the cable, the secondary anchor (e.g., screw) compresses and holds in place but does not cut the cable. Another advantage is that the cable does not need to be tied, eliminating the presence of knots in the patient's body.

Turning now to the Figures, FIG. 1 is a top view of an anchoring apparatus 2 of the invention with the secondary anchor 6 mated to the primary anchor 4. FIG. 1 shows the primary anchor 4 as the outermost concentric ring; the secondary anchor 6 is represented by the inner circles. The dashed line in FIG. 1 represents the mating end section 8 of the secondary anchor, the mating end section 8 further defining a secondary anchor receptacle 10 (shown as a hexagon shape) which is sized and configured to receive a tool which can tighten the secondary anchor 6 to mate securely with the primary anchor 4. The secondary anchor 6 is in the primary bore (not shown).

Figure 2:
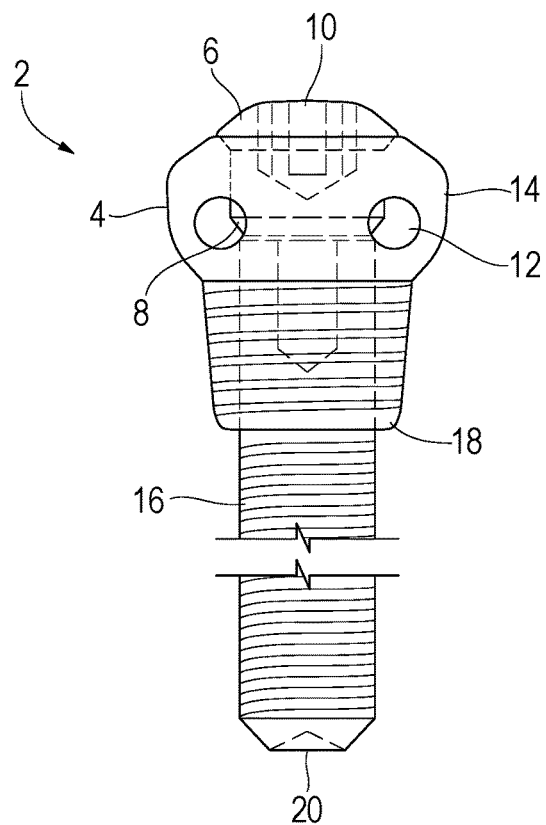
FIG. 2 is a side view of a primary anchor with a secondary anchor secured therein.

FIG. 2 is a side view of an anchoring apparatus 2 of the invention showing the primary anchor 4, secondary anchor 6, mating end section 8 of the secondary anchor, and the secondary anchor receptacle 10 sized and configured to receive a tool. The secondary anchor 6 is shown in FIG. 2 mated with and extending into the primary bore (not shown). Also shown in FIG. 2 are the substantially parallel bores 12 in the head section 14 of the primary anchor 4, extension member 16 threaded into the interior of the tail section 18 of the primary anchor 4, and tail section opening 20.

Figure 3:
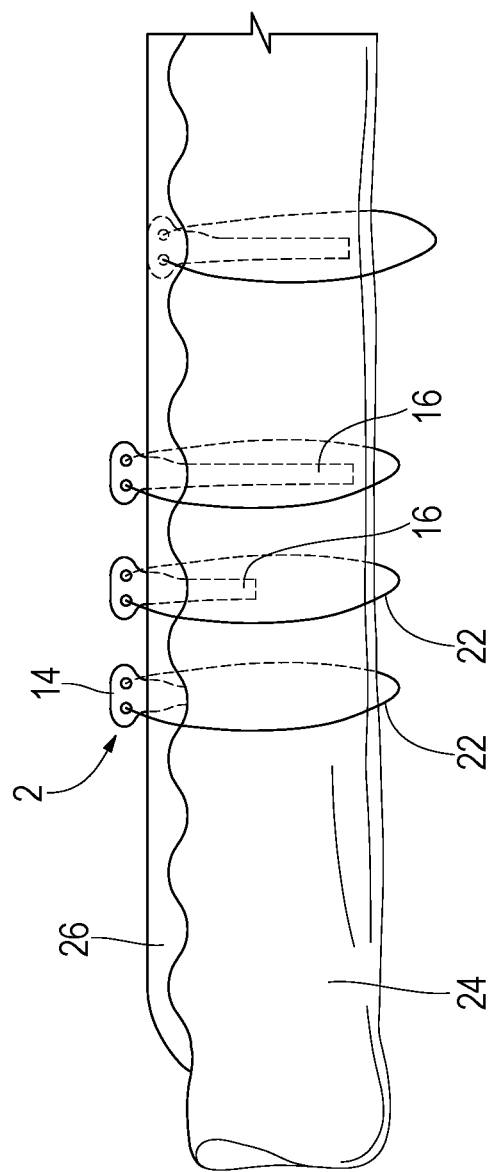
FIG. 3 is a side view of a plurality of anchoring apparatus in use with a support plate and bone tissue.

FIG. 3 shows a plurality of anchoring apparatus 2 of the invention with a cable 22 around bone tissue 24 and a support plate 26, the cable 22 drawn through one of the substantially parallel bores 12 in the head section 14 of the primary anchor 4. Some of the anchoring apparatus 2 shown in FIG. 3 have an extension member 16 attached. As shown, the anchoring apparatus 2 that does not have an extension member 16 attached does not extend into the bone tissue 24. As shown in FIG. 3, the primary anchor 4 does not have to go into body tissue; the primary anchor 4 or the extension member 16 can go into the optional support plate, or into both support plate and bone.

One of the anchoring apparatus 2 in FIG. 3 is shown with its top flush with top of support plate 26. For such a configuration, although not depicted in FIG. 3, support plate 26 may alternatively also have holes that align with the bores 12 of the head section 14 when mated with support plate 26 to be flush with the outer surface of the support plate 26, so that the cable 22 can extend through both the head section 14 and support plate 26.

Figure 4:
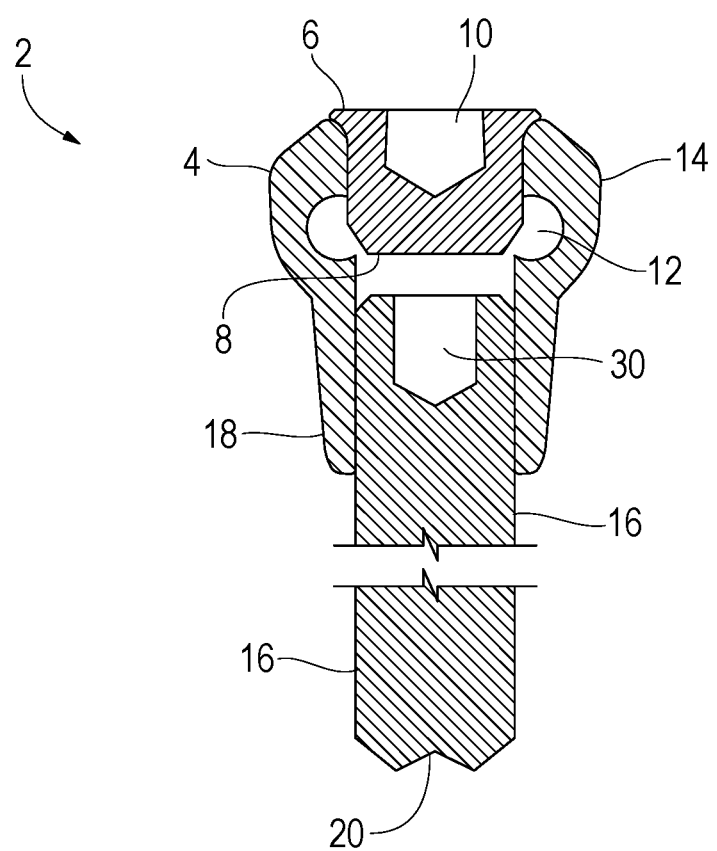
FIG. 4 is a cutaway view of an anchoring apparatus 2 of the invention.

FIG. 4 is a cutaway view of an anchoring apparatus 2 of the invention showing a primary anchor 4, a secondary anchor 6, and an extension member 16 threaded into tail section 18 of the primary anchor 4. Primary anchor 4 is in two pieces: the head section 14 and the tail section 18. Mating end section 8 of the secondary anchor 6 is shown extending into the substantially parallel bores 12 defined by the head section 14 of the primary anchor 4. The secondary anchor receptacle 10 at the top of the secondary anchor 6 is sized and configured to receive a tool. Similarly, at the top of extension member 16 is an extension member receptacle 30 which is sized and configured to receive a tool. Tail section opening 20 is at the end of extension member 16 opposite to the secondary anchor 6.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation in its practice. Therefore the foregoing description is not intended to limit, and should not be construed as limiting, the invention to the particular exemplifications presented hereinabove.

That which is claimed is:

1. An anchoring apparatus comprising
a primary anchor which defines i) a primary bore extending along an imaginary longitudinal axis of the primary anchor, ii) a tail section defining a tail section opening of the primary bore, and iii) a head section defining a head section opening of the primary bore and defining a pair of substantially parallel bores extending through the head section of the primary anchor, each parallel bore
   (a) extending along an imaginary bore axis which is disposed at an angle relative to the imaginary longitudinal axis of the primary anchor,
   (b) being in communication with at least a portion of the primary bore, and
   (c) being sized and configured to receive a portion of a cable therein and therethrough,
   wherein the primary anchor has one or more of the following features:
      (i) the head section forms a threaded section on an interior surface portion of a sidewall of the primary bore,
      (ii) the tail section forms a threaded section on an interior surface portion of the sidewall of the primary bore and/or on an exterior surface of the primary anchor, and
      (iii) wherein the primary anchor forms a threaded exterior; and
a secondary anchor sized and configured to mate with the head section of the primary anchor at the head section opening of the primary bore, the secondary anchor comprising a mating end section sized and configured to extend into a portion of each of the pair of substantially parallel bores when the mating end section is received by the primary anchor at the head section opening of the primary bore.

2. The anchoring apparatus as in claim 1 wherein the secondary anchor is threaded, and is sized and configured to mate with at least a portion of the threaded section of the head section of the primary anchor.

3. The anchoring apparatus as in claim 1 further comprising an extension member sized and configured to connect with at least a portion of the tail section of the primary anchor, and optionally further comprising at least one support plate defining one or more apertures, each aperture being sized and configured to receive at least a portion of the extension member.

4. The anchoring apparatus as in claim 1 further comprising a threaded cylindrical extension member sized and configured to mate with the primary bore at the tail section opening, and optionally further comprising at least one support plate defining one or more apertures, each aperture being sized and configured to receive at least a portion of the extension member.

5. The anchoring apparatus as in claim 1 further comprising at least one support plate defining one or more apertures, each aperture being sized and configured to receive at least a portion of the primary anchor.

6. The anchoring apparatus as in claim 1 wherein the imaginary bore axis is substantially perpendicular relative to the imaginary longitudinal axis of the primary anchor.

7. An anchoring apparatus comprising:
one or more anchor sets, each anchor set comprising
   a primary anchor which defines i) a primary bore extending along an imaginary longitudinal axis of the primary anchor, ii) a tail section defining a tail section opening of the primary bore, and iii) a head section defining a head section opening of the primary bore and defining a pair of substantially parallel bores extending through the head section of the primary anchor, each parallel bore
      (a) extending along an imaginary bore axis which is disposed at an angle relative to the imaginary longitudinal axis of the primary anchor,
      (b) being in communication with at least a portion of the primary bore, and
      (c) being sized and configured to receive a portion of a cable therein and therethrough;
   wherein the primary anchor has one or more of the following features:
      (i) the head section forms a threaded section on an interior surface portion of a sidewall of the primary bore,
      (ii) the tail section forms a threaded section on an interior surface portion of the sidewall of the primary bore and/or on an exterior surface of the primary anchor, and
      (iii) wherein the primary anchor forms a threaded exterior;
   a secondary anchor sized and configured to mate with the head section of the primary anchor at the head section opening of the primary bore, the secondary anchor comprising a mating end section sized and configured to extend into a portion of each of the pair of substantially parallel bores when the mating end section is received by the primary anchor at the head section opening of the primary bore; and
   a cable, the cable comprising two end sections, each end section being sized and configured to extend through a respective one of the pair of substantially parallel bores, so that a portion of the cable is held in its respective one of the pair of substantially parallel bores by the secondary anchor when the mating end section of the secondary anchor is mated with the head section of the primary anchor at the head section opening.

8. The anchoring apparatus as in claim 7 wherein the secondary anchor is threaded, and is sized and configured to mate with at least a portion of the threaded section of the head section of the primary anchor.

9. The anchoring apparatus as in claim 7 wherein the anchor set further comprises an extension member sized and configured to connect with at least a portion of the tail section of the primary anchor, and optionally further comprises at least one support plate defining one or more apertures, each aperture being sized and configured to receive at least a portion of the extension member.

10. The anchoring apparatus as in claim 7 wherein the anchor set further comprises a threaded cylindrical extension member sized and configured to mate with the primary bore at the tail section opening, and optionally further comprises at least one support plate defining one or more apertures, each aperture being sized and configured to receive at least a portion of the extension member.

11. The anchoring apparatus as in claim 7 wherein the anchor set further comprises at least one support plate defining one or more apertures, each aperture being sized and configured to receive at least a portion of the primary anchor.

12. The anchoring apparatus as in claim 7 wherein the imaginary bore axis is substantially perpendicular relative to the imaginary longitudinal axis of the primary anchor.

* * * * *